(12) United States Patent (10) Patent No.: US 12,504,066 B2
Katayama et al. (45) Date of Patent: Dec. 23, 2025

(54) VEHICULAR DRIVE DEVICE CAPABLE OF SECURING AN APPROPRIATE AMOUNT OF OIL IN A FIRST HOUSING CHAMBER AND A SECOND HOUSING CHAMBER

(71) Applicant: AISIN CORPORATION, Kariya (JP)

(72) Inventors: Takatoshi Katayama, Kariya (JP); Takuya Muneto, Kariya (JP); Takayoshi Hanai, Kariya (JP); Yusuke Naito, Kariya (JP); Teppei Yamashita, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/700,564

(22) PCT Filed: Mar. 28, 2023

(86) PCT No.: PCT/JP2023/012354
§ 371 (c)(1),
(2) Date: Apr. 11, 2024

(87) PCT Pub. No.: WO2023/190421
PCT Pub. Date: Oct. 5, 2023

(65) Prior Publication Data
US 2024/0401691 A1 Dec. 5, 2024

(30) Foreign Application Priority Data
Mar. 29, 2022 (JP) .................................. 2022-053839

(51) Int. Cl.
*F16H 57/04* (2010.01)
(52) U.S. Cl.
CPC ....... *F16H 57/045* (2013.01); *F16H 57/0453* (2013.01); *F16H 57/0476* (2013.01)
(58) Field of Classification Search
CPC . F16H 57/045; F16H 57/0453; F16H 57/0476
See application file for complete search history.

(56) References Cited

U.S. PATENT DOCUMENTS 7,982,346 B2 7/2011 Mogi et al.
11,466,769 B2 * 10/2022 Kuramoto ........... F16H 57/0424
(Continued)

FOREIGN PATENT DOCUMENTS

DE 102015214334 A1 2/2017
JP 5328231 B2 10/2013
(Continued)

OTHER PUBLICATIONS

Jan. 22, 2025 Extended Search Report issued in European Patent Application No. 23780430.7.
(Continued)

*Primary Examiner* — Minh Truong
(74) *Attorney, Agent, or Firm* — Oliff PLC (57) ABSTRACT

A vehicular drive device includes a rotating electrical machine, transmission mechanism, case, and communication oil passage. The case includes a first housing chamber housing the rotating electrical machine and a second housing chamber housing the transmission mechanism. The communication oil passage communicates with the first and second housing chambers. The lower part of the second housing chamber forms a second oil reservoir where oil is scraped up by gear rotation. The case includes a partition wall between the first and second housing chambers axially. The communication oil passage runs under the partition wall and includes a first and second opening. The first opening opens to the first housing chamber at a first position away from the partition wall toward the first side in the axial direction. The second opening opens to the second housing chamber at a second position away from the partition wall toward the second side axially.

14 Claims, 9 Drawing Sheets

(56) References Cited

U.S. PATENT DOCUMENTS

| | | | | |
|---|---|---|---|---|
| 2011/0203898 A1* | 8/2011 | Harashima | ............ | H02K 7/116 |
| | | | | 475/160 |
| 2013/0145879 A1 | 6/2013 | Nakamura et al. | | |
| 2024/0167559 A1* | 5/2024 | Hirata | ...................... | H02K 9/19 |

FOREIGN PATENT DOCUMENTS

| | | | |
|---|---|---|---|
| JP | 2021-112052 A | 8/2021 | |
| JP | 2021-148140 A | 9/2021 | |
| WO | WO-2024203568 A1 * | 10/2024 | ............ F16H 57/04 |

OTHER PUBLICATIONS

May 16, 2023 Search Report issued in International Patent Application No. PCT/JP2023/012354.

* cited by examiner

VEHICULAR DRIVE DEVICE CAPABLE OF SECURING AN APPROPRIATE AMOUNT OF OIL IN A FIRST HOUSING CHAMBER AND A SECOND HOUSING CHAMBER

TECHNICAL FIELD

The present disclosure relates to a vehicular drive device.

BACKGROUND ART

There is a known technology in which a case includes a first housing chamber that houses a rotating electrical machine and a second housing chamber that houses a transmission mechanism, and the oil accumulated at the bottom of the second housing chamber is scraped up by the rotation of the gear of the transmission mechanism and supplied to the various bearings of the transmission mechanism. In this conventional technology, a communication oil passage is formed in the partition wall of the case, which partitions between the first housing chamber and the second housing chamber in the axial direction. The communication oil passage allows the first housing chamber and the second housing chamber to communicate at their lower parts.

PRIOR ART DOCUMENT

Patent Document

Patent Document 1: JP 2021-112052 A

SUMMARY OF THE DISCLOSURE

Problems to be Solved by the Disclosure

In the conventional technology, as described above, the communication oil passage is formed in the partition wall of the case. Accordingly, there is a risk that an appropriate amount of oil cannot be secured in the lower part of the first housing chamber and the lower part of the second housing chamber depending on the position (posture) or behavior of the vehicle. Specifically, the oil in the case flows back and forth between the lower part of the first housing chamber and the lower part of the second housing chamber through the communication oil passage depending on the position or behavior of the vehicle. In the case of the communication oil passage as in the above conventional technology, the amount of oil tends to be too large in one of the first housing chamber and the second housing chamber (too small in the other). For example, if there is a shortage of oil in the second housing chamber, the oil scraped up by the rotation of the gear may be insufficient, resulting in insufficient lubrication of the bearings.

Therefore, in one aspect, the object of the present disclosure is to provide a technology capable of securing an appropriate amount of oil in a first housing chamber and a second housing chamber regardless of various changes in the position or behavior of the vehicle, as well as forming a communication oil passage that allows the first housing chamber and the second housing chamber to communicate.

Means for Solving the Problems

In one aspect of the present disclosure, there is provided a vehicular drive device including: a rotating electrical machine that has a rotor shaft extending in the axial direction; a transmission mechanism that transmits a driving force from the rotating electrical machine to wheels; a case that includes a first housing chamber configured to house the rotating electrical machine and a second housing chamber configured to house the transmission mechanism, the first housing chamber and the second housing chamber being located on a first side and a second side in the axial direction, respectively; and a communication oil passage through which oil passes and which communicates with the first housing chamber and the second housing chamber. The lower part of the first housing chamber forms a first oil reservoir space in which oil accumulates. The lower part of the second housing chamber forms a second oil reservoir space in which oil to be scraped up by the rotation of a gear that constitutes the transmission mechanism accumulates. The case includes a partition wall that at least partially partitions between the first housing chamber and the second housing chamber in the axial direction and extends above the first oil reservoir space and the second oil reservoir space. The communication oil passage runs under the partition wall and includes: a first opening that opens to the first housing chamber at a first position away from the partition wall toward the first side in the axial direction, and a second opening that opens to the second housing chamber at a second position away from the partition wall toward the second side in the axial direction.

Effects of the Disclosure

According to one aspect of the present disclosure, it is possible to secure an appropriate amount of oil in a first housing chamber and a second housing chamber regardless of various changes in the position or behavior of the vehicle, as well as to form a communication oil passage that allows the first housing chamber and the second housing chamber to communicate.

MODES FOR CARRYING OUT THE DISCLOSURE

Exemplary embodiments of the present disclosure will now be described with reference to the accompanying drawings. It should be noted that although parts or elements are illustrated in exemplary proportions in the drawings, their dimensions do not necessarily have to be in these proportions. In addition, the shapes or the like of the parts or elements may be partially exaggerated in the drawings for convenience of explanation.

In the following, a description will first be given of a vehicular drive system 100 to which a vehicular drive device 17 of the present embodiment is suitably applicable. The vehicular drive device 17 of the embodiment will then be described.

[Entire Drive System]

Figure 1:
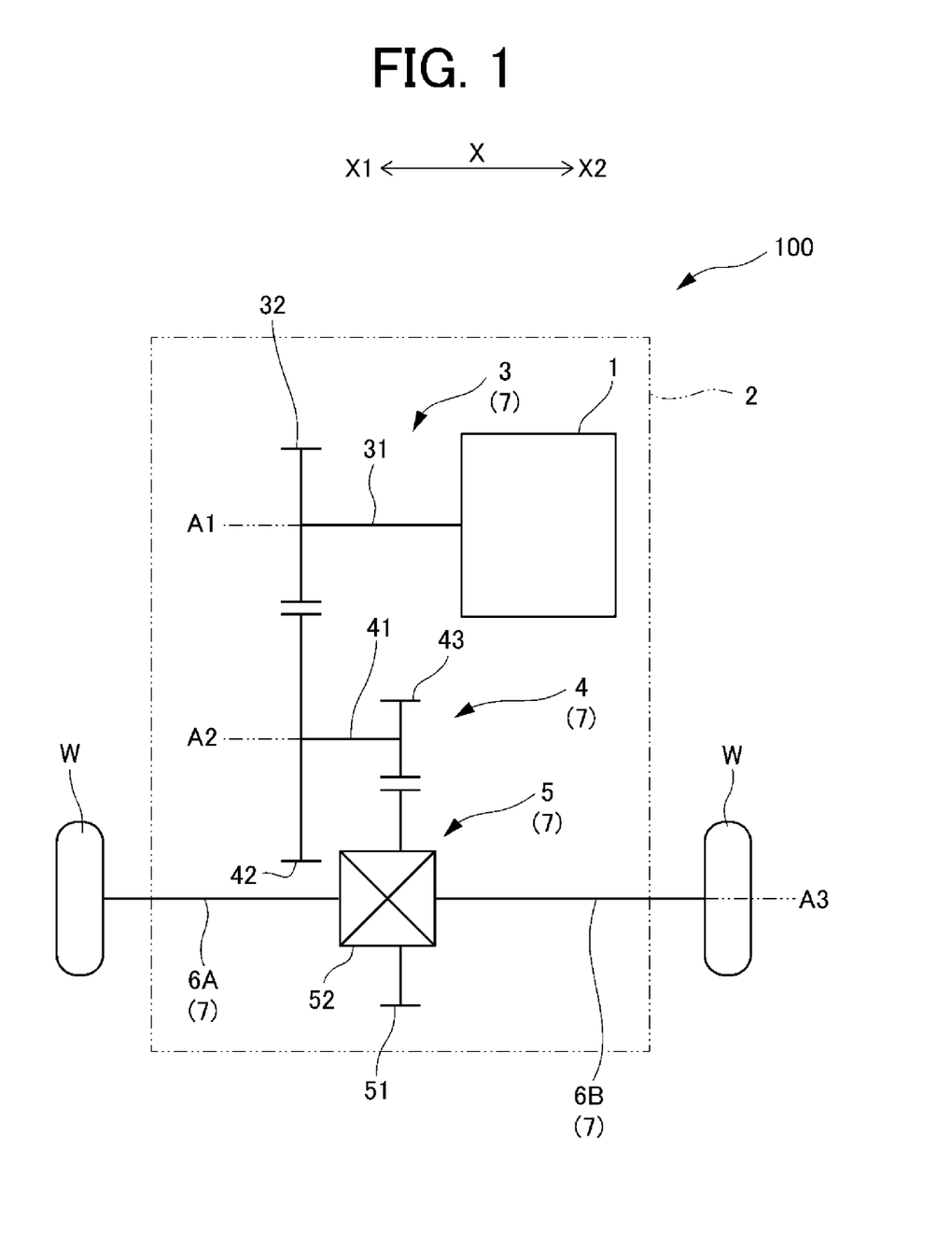
FIG. 1 is a single-line diagram of a vehicular drive system including a rotating electrical machine and a power transmission mechanism.

FIG. 1 is a single-line diagram of the vehicular drive system 100 including a rotating electrical machine 1 and a power transmission mechanism 7. In FIG. 1, the X direction is indicated, and an X1 side (an example of a second side) and an X2 side (an example of a first side) are defined along the X direction. The X direction is parallel to the direction of a first axis A1 (hereinafter also referred to as the "axial direction").

In the example of FIG. 1, the vehicular drive system 100 includes the rotating electrical machine 1 and the power transmission mechanism 7. The rotating electrical machine 1 serves as a drive for wheels W. The power transmission mechanism 7 is located in a power transmission path that connects the rotating electrical machine 1 and the wheels W. The power transmission mechanism 7 includes an input member 3, a counter gear mechanism 4, a differential gear mechanism 5, and left and right output members 6A and 6B.

The input member 3 includes an input shaft 31 and an input gear 32. The input shaft 31 is a rotating member that rotates about the first axis A1. The input gear 32 is a gear that transmits torque (driving force) from the rotating electrical machine 1 to the counter gear mechanism 4. In the input member 3, the input gear 32 is provided on the input shaft 31 so as to rotate integrally with the input shaft 31.

The counter gear mechanism 4 is located between the input member 3 and the differential gear mechanism 5 in the power transmission path. The counter gear mechanism 4 includes a counter shaft 41, a first counter gear 42, and a second counter gear 43.

The counter shaft 41 is a rotating member that rotates about a second axis A2. The second axis A2 extends parallel to the first axis A1. The first counter gear 42 is an input element of the counter gear mechanism 4. The first counter gear 42 is configured to mesh with the input gear 32 of the input member 3. The first counter gear 42 is connected to the counter shaft 41 so as to rotate integrally with the counter shaft 41.

The second counter gear 43 is an output element of the counter gear mechanism 4. In this embodiment, as an example, the second counter gear 43 is formed to have a smaller diameter than the first counter gear 42. The second counter gear 43 is provided on the counter shaft 41 so as to rotate integrally with the counter shaft 41.

The differential gear mechanism 5 is located on a third axis A3, which is its rotation axis. The third axis A3 extends parallel to the first axis A1. The differential gear mechanism 5 distributes the driving force transmitted from the rotating electrical machine 1 to the left and right output members 6A and 6B. The differential gear mechanism 5 includes a differential input gear 51 configured to mesh with the second counter gear 43 of the counter gear mechanism 4. The differential gear mechanism 5 further includes a differential case 52, which houses therein a pinion shaft, a pinion gear, left and right side gears, and the like. The left and right side gears are connected to the left and right output members 6A and 6B, respectively, so as to rotate integrally therewith.

The left and right output members 6A and 6B are drivingly connected to the left and right wheels W, respectively.

The left and right output members 6A and 6B each transmit the driving force distributed by the differential gear mechanism 5 to a corresponding one of the wheels W. Incidentally, the left and right output members 6A and 6B may be formed of two or more members.

In this manner, the rotating electrical machine 1 drives the wheels W through the power transmission mechanism 7. Note that other reduction mechanisms, such as a planetary gear mechanism, may also be utilized in other embodiments.

[Vehicular Drive Device]

Figure 2:
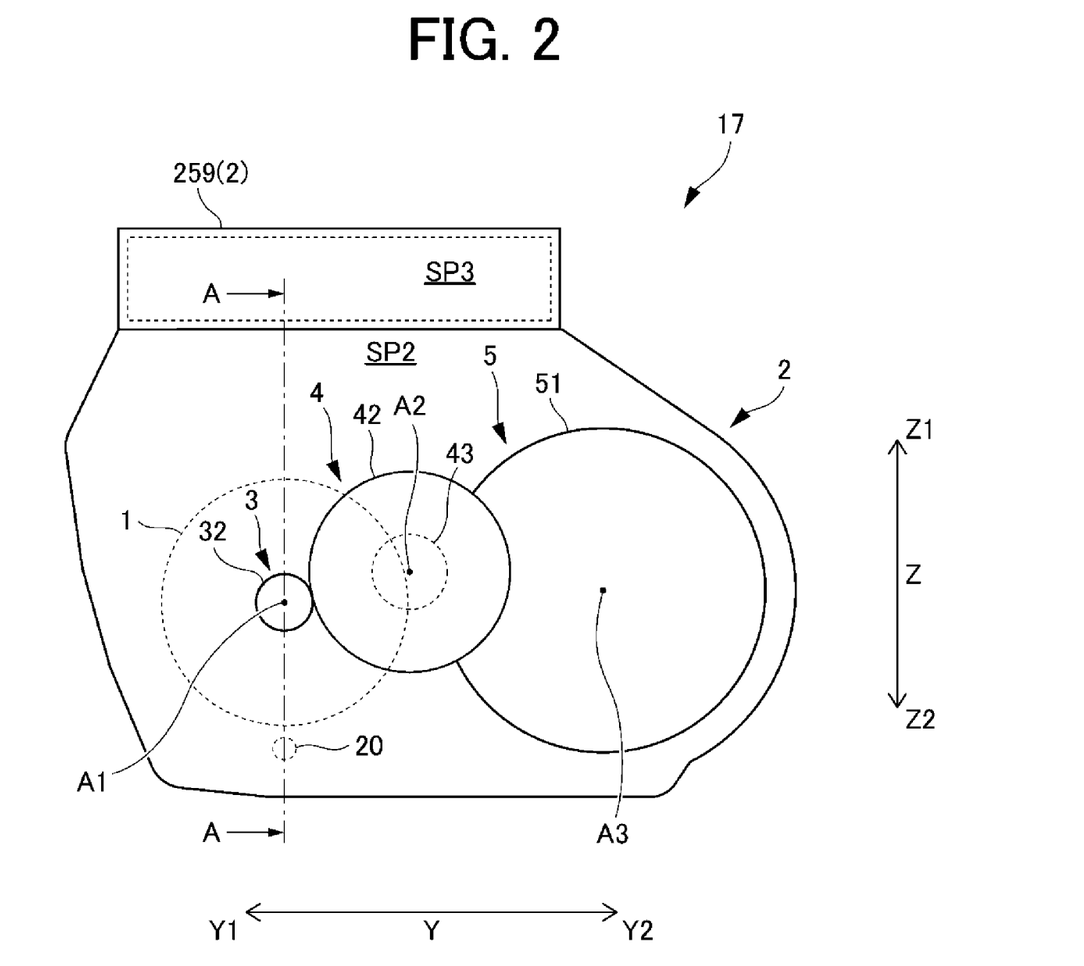
FIG. 2 is a schematic diagram of the main parts of a vehicular drive device as viewed along a first axis.
Figure 3:
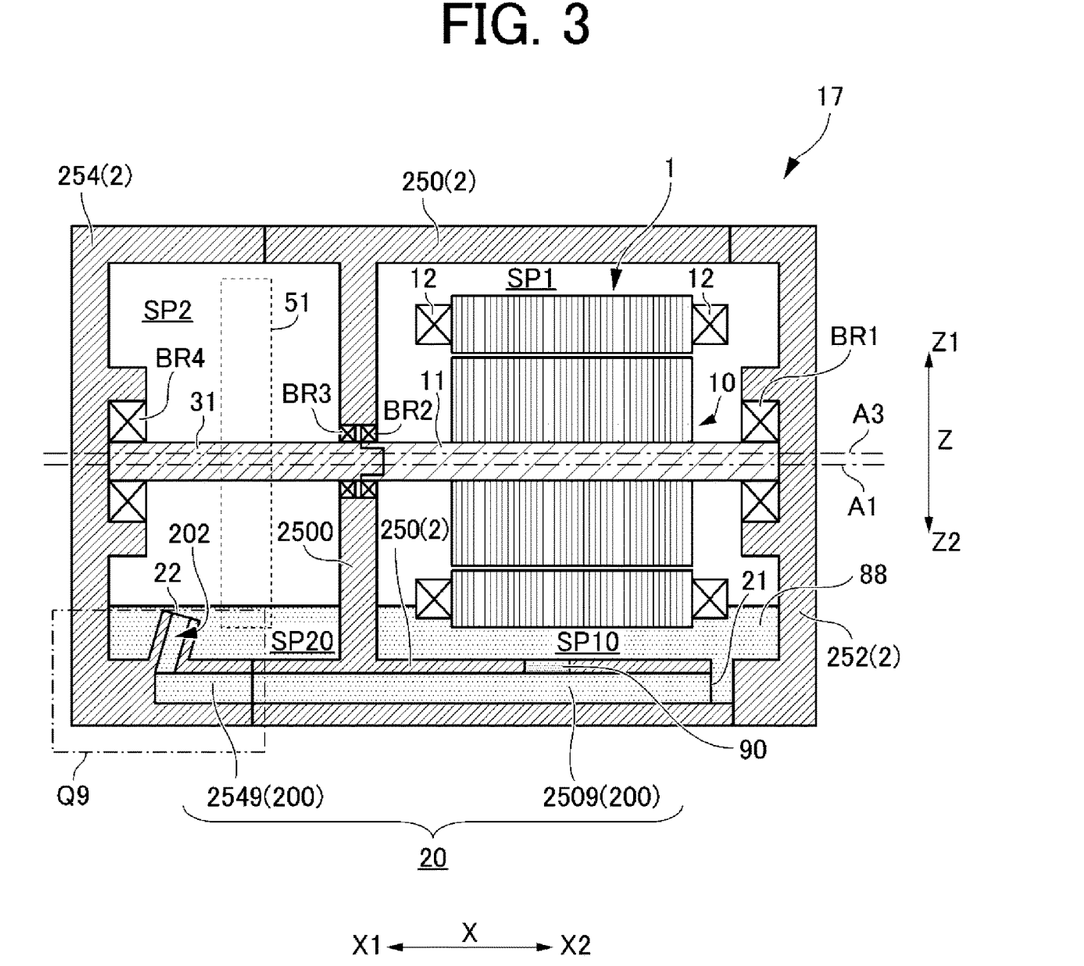
FIG. 3 is a cross-sectional view of the main parts of the vehicular drive device, taken along line A-A in FIG. 2.

FIG. 2 is a schematic diagram of the main parts of the vehicular drive device 17 as viewed along the first axis A1 from the X1 side. FIG. 3 is a cross-sectional view of the main parts of the vehicular drive device 17, taken along line A-A in FIG. 2. Note that FIG. 2 is a simplified explanatory diagram and does not illustrate part of a case 2 and the like. In FIG. 2, the Y direction is indicated, and a Y1 side and a Y2 side are defined along the Y direction. Similarly, in FIGS. 2 and 3, the Z direction is indicated, and a Z1 side and a Z2 side are defined along the Z direction. It is assumed herein that the Z direction is parallel to the vertical direction and that the Z1 side corresponds to the upper side. In the example of FIG. 2, the first axis A1 and the third axis A3 are located at approximately the same height, and the second axis A2 is located above the first axis A1 and the third axis A3; however, the axes may be in other positional relationships. For example, the first axis A1 may be located slightly below the third axis A3, and the first axis A1 and the second axis A2 may be located at approximately the same height.

The vehicular drive device 17 includes the rotating electrical machine 1 and the power transmission mechanism 7, which are housed in the case 2.

The case 2 may be made of, for example, aluminum or the like. The case 2 can be formed by casting or the like. The case 2 includes a motor case 250, a motor cover 252, a gear case 254, and an inverter cover 259 (see FIG. 2).

The motor case 250 has an inner space forming a motor housing chamber SP1 that houses the rotating electrical machine 1. Incidentally, the inner space forming the motor housing chamber SP1 only needs to be at least partially surrounded by walls and does not need to be completely closed by walls. The same applies to other housing chambers, such as a gear housing chamber SP2. The motor case 250 has a peripheral wall surrounding the radially outer side of the rotating electrical machine 1. Although the motor case 250 is assumed herein to be integrally molded, it may be formed by combining a plurality of members.

In the example of FIG. 3, the motor case 250 has a partition wall 2500 that partitions between the motor housing chamber SP1 and the gear housing chamber SP2 in the axial direction. The partition wall 2500 faces the bottom of the motor cover 252 in the axial direction.

The partition wall 2500 may support bearings BR2 and BR3 on the inside in the radial direction. The bearing BR2 rotatably supports a rotor shaft 11 in cooperation with a bearing BR1 supported by the motor cover 252. The bearing BR3 rotatably supports the input shaft 31 in cooperation with a bearing BR4 supported by the gear case 254. Incidentally, one of the bearings BR2 and BR3 may be omitted in a modification.

The motor cover 252 is coupled to the X2 side of the motor case 250 in the X direction. The motor cover 252 is configured to cover the X2 side of the motor housing chamber SP1 in the X direction. In this case, the motor cover 252 may cover the opening of the motor case 250 on the X2 side in the X direction so as to close it completely or almost completely. The motor cover 252 may form part of the motor housing chamber SP1 on the X2 side in the X direction.

The motor case 250 may also have an inverter housing chamber SP3. The inverter housing chamber SP3 may house an inverter (not illustrated) that drives the rotating electrical machine 1. The inverter housing chamber SP3 may extend in the axial direction such that it is adjacent to the motor housing chamber SP1 and the gear housing chamber SP2 in the radial direction.

The inverter cover 259 may be provided to cover the upper opening of the inverter housing chamber SP3. In this manner, the inverter cover 259 may form the inverter housing chamber SP3 as a closed space. In this case, electromagnetic compatibility (EMC) measures related to the inverter can be properly implemented, and problems such as spatial resonance can be reduced.

The characteristic configuration of the embodiment will be described below with further reference to FIGS. 2 and 3.

In this embodiment, of the motor housing chamber SP1, the gear housing chamber SP2, and the inverter housing chamber SP3, the motor housing chamber SP1 and the gear housing chamber SP2 each form an oil-tight space. The case 2 has a certain amount of oil in the motor housing chamber SP1 and the gear housing chamber SP2. In this case, the lower part of the motor housing chamber SP1 forms an oil reservoir space SP10 in which oil accumulates, while the lower part of the gear housing chamber SP2 forms an oil reservoir space SP20 in which oil accumulates. In FIG. 3, a shaded area 88 schematically indicates the oil accumulated in the oil reservoir space SP10 and the oil reservoir space SP20. The partition wall 2500 of the case 2 may be formed to extend above the oil reservoir space SP10 and the oil reservoir space SP20 so as to partition between the motor housing chamber SP1 and the gear housing chamber SP2 in the axial direction. Note that the partition wall 2500 does not need to completely separate the motor housing chamber SP1 and the gear housing chamber SP2 from each other: the motor housing chamber SP1 and the gear housing chamber SP2 may communicate at the top or around the first axis A1.

The oil accumulated in the oil reservoir space SP10 of the motor housing chamber SP1 may be sucked up by an oil pump (e.g., an electric oil pump) through a strainer 90 and used for cooling and lubricating the rotating electrical machine 1. For example, the oil may be supplied to the rotor shaft or coil end 12 of the rotating electrical machine 1. The oil may also be supplied to the bearings BR1 and BR2 that rotatably support the rotor shaft 11 of the rotating electrical machine 1.

The oil accumulated in the oil reservoir space SP20 of the gear housing chamber SP2 is scraped up by the differential input gear 51 and used to lubricate the power transmission mechanism 7. For example, the oil scraped up by the differential input gear 51 may be supplied to the bearings BR3 and BR4 that rotatably support the input shaft 31 through a catcher (not illustrated), which may be provided at the upper part of the gear housing chamber SP2.

In this embodiment, the case 2 has a communication oil passage 20 that communicates with the motor housing chamber SP1 and the gear housing chamber SP2. In other words, the motor housing chamber SP1 and the gear housing chamber SP2 are not oil-tight spaces independent of each other but spaces that communicate with each other through the communication oil passage 20. Accordingly, the oil that accumulates in the oil reservoir space SP10 at one time may constitute the oil that accumulates in the oil reservoir space SP20 at another time. As described above, according to the embodiment, the case 2 is provided with the communication oil passage 20 that communicates with the motor housing chamber SP1 and the gear housing chamber SP2. This makes it possible to share the oil between the motor housing chamber SP1 and the gear housing chamber SP2 and to increase the convenience of activities such as oil changes.

In this embodiment, the communication oil passage 20 runs under the partition wall 2500. That is, the communication oil passage 20 is in a different form than a hole formed in the partition wall 2500 (communication hole 20' illustrated in FIG. 4, etc., which will be described later). Therefore, the communication oil passage 20 can be provided with openings 21 and 22 to the motor housing chamber SP1 and the gear housing chamber SP2 at positions away from the partition wall 2500 in the X direction. Specifically, in this embodiment, the opening 21 that opens to the motor housing chamber SP1 is located in a position away from the partition wall 2500 toward the X2 side (an example of a first position), while the opening 22 that opens to the gear housing chamber SP2 is located in a position away from the partition wall 2500 toward the X1 side (an example of a second position). The opening 21 opens to the oil reservoir space SP10, and the opening 22 opens to the oil reservoir space SP20.

In this embodiment, due to the presence of the communication oil passage 20, the oil level is in a horizontal plane when the vehicle is in a horizontal position or posture (i.e., in a position in which the first axis A1 is located in a substantially horizontal plane), as schematically illustrated in FIG. 3. Thereby, when the vehicle is in a horizontal position, a desired amount of oil can be secured in each of the oil reservoir space SP10 and the oil reservoir space SP20.

The opening 21 is preferably located on the X2 side (axially outside) of the strainer 90. This effectively reduces the possibility of the strainer 90 being exposed to the air in a first inclined position, which will be described later with reference to FIG. 7. The opening 21 may be an upward opening or an axial opening. If the opening 21 is an axial opening, it can be easily formed along with the formation of the communication oil passage 20.

The opening 22 is preferably located on the X1 side (axially outside) of the differential input gear 51. This effectively reduces the possibility of the lower part of the differential input gear 51 being exposed to the air (i.e., the possibility of the differential input gear 51 not being able to scrape up oil) in a second inclined position, which will be described later with reference to FIG. 8. Although the opening 22 may be an axial opening, it is preferably an upward opening. The significance of such an upward opening will be described later.

As illustrated in FIG. 3, the communication oil passage 20 preferably extends linearly in the axial direction. This facilitates the formation of the communication oil passage 20 in the case 2. However, depending on various layouts and the shape of the case 2, the communication oil passage 20 may be formed differently from that illustrated in the drawings. For example, the communication oil passage 20 may have local differences in its height, or it may have a section that is inclined with respect to a horizontal plane.

In the example of FIG. 2, the communication oil passage 20 is formed at a position that overlaps the rotating electrical machine 1 in the vertical direction (e.g., at a position directly below the first axis A1) as viewed in the axial direction; however, it may be disposed at a position that does not overlap the rotating electrical machine 1. For example, the communication oil passage 20 may be formed between the rotating electrical machine 1 and the differential input gear 51 in the Y direction (e.g., at a position that overlaps the counter shaft 41 as viewed in the vertical direction).

In this embodiment, the communication oil passage 20 is formed in each of the motor case 250 and the gear case 254. In other words, the communication oil passage 20 includes an oil passage 2509 formed in the motor case 250 and an oil passage 2549 formed in the gear case 254. The X1 side end of the oil passage 2509 and the X2 side end of the oil passage 2549 are continuous at the axial mating surfaces of the motor case 250 and the gear case 254. Note that the X1 side end of the oil passage 2509 and the X2 side end of the oil passage 2549 need only be in face-to-face contact, and it is not necessary to seal around the communication oil passage 20.

Next, the effects of the embodiment will be described with reference to FIGS. 4 to 8.

Figure 4:
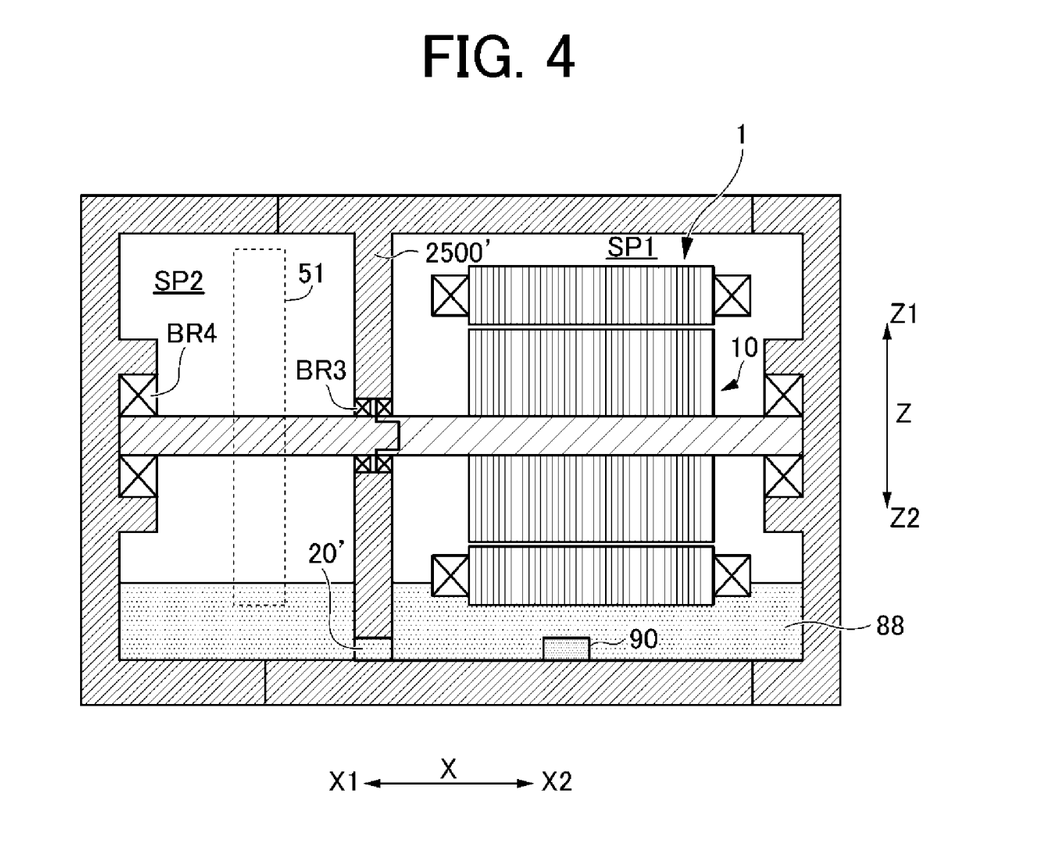
FIG. 4 is a diagram illustrating a configuration (horizontal position) according to a comparative example.
Figure 5:
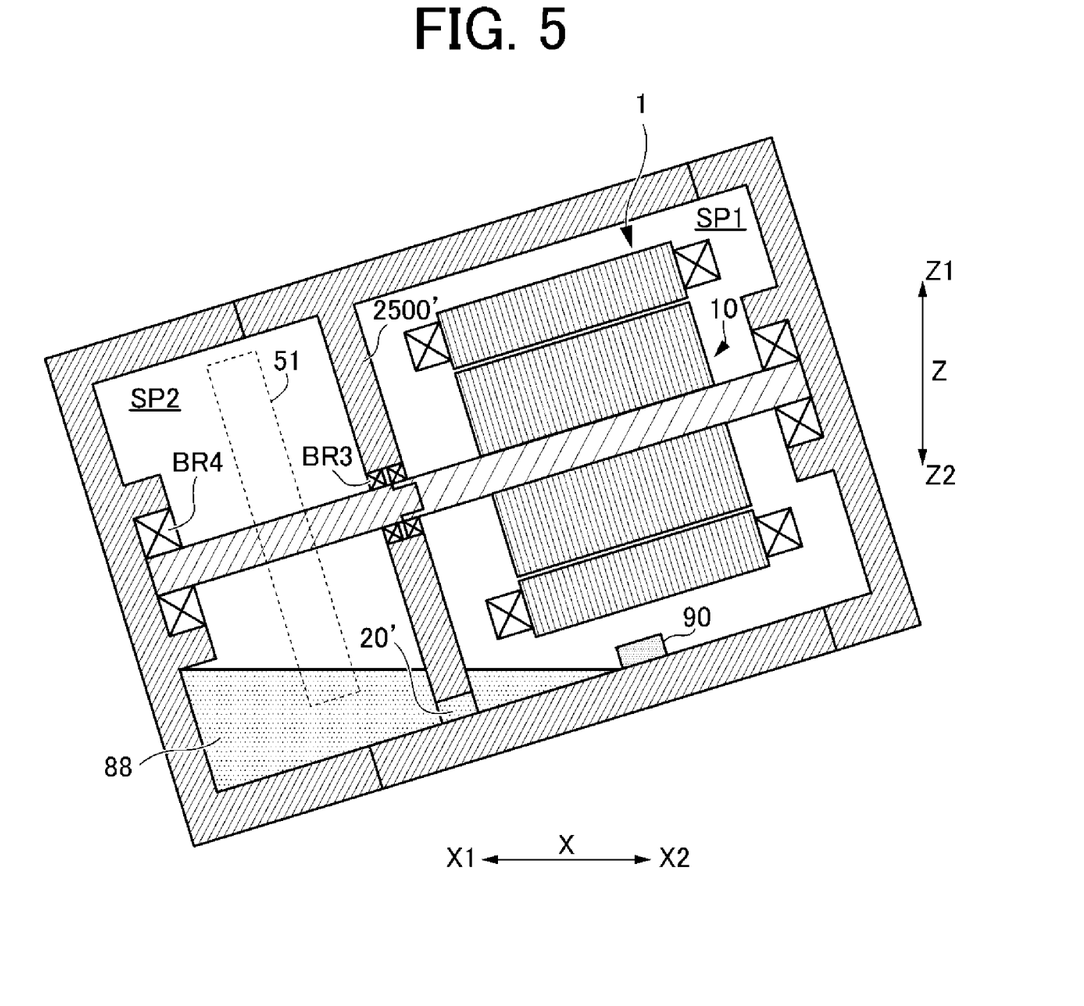
FIG. 5 is a diagram illustrating a configuration (first inclined position) according to the comparative example.
Figure 6:
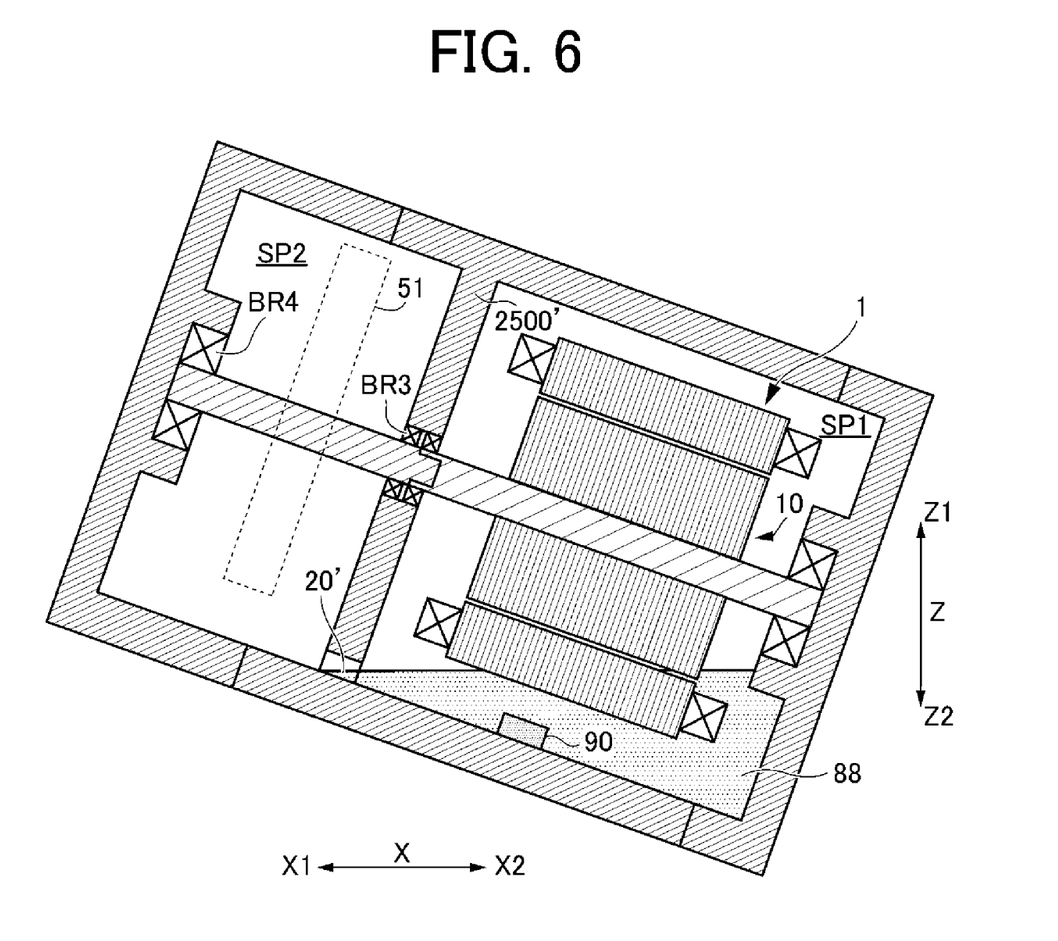
FIG. 6 is a diagram illustrating a configuration (second inclined position) according to the comparative example.
Figure 7:
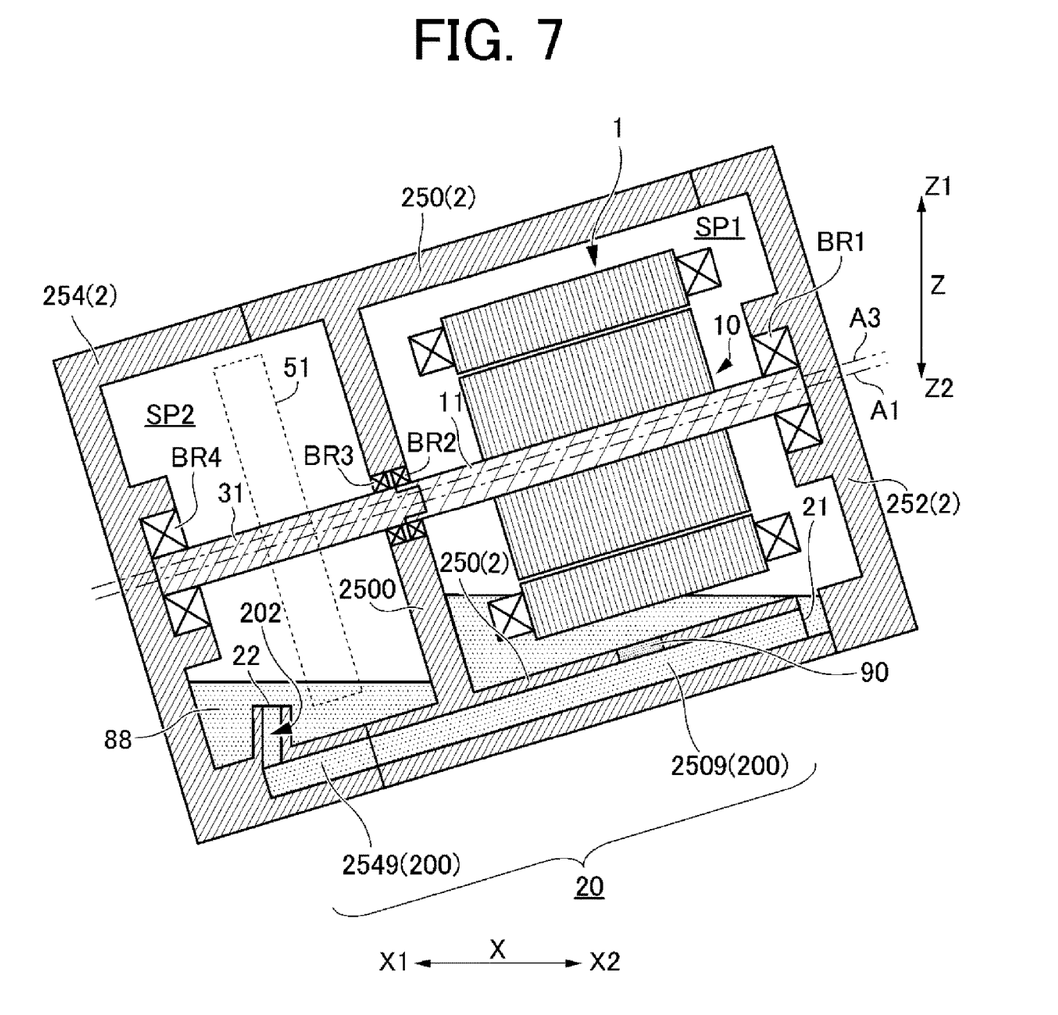
FIG. 7 is a diagram illustrating a configuration (first inclined position) according to an embodiment.
Figure 8:
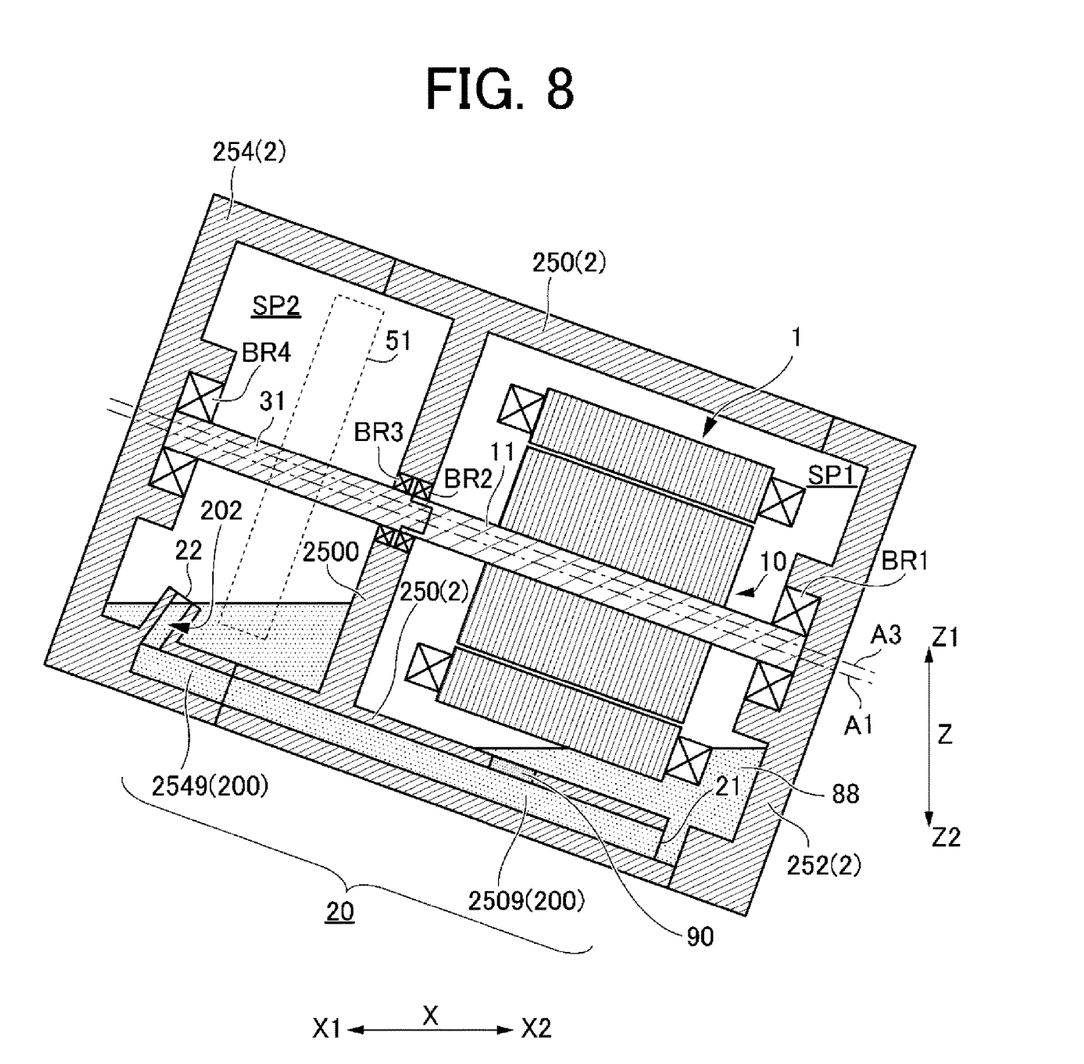
FIG. 8 is a diagram illustrating a configuration (second inclined position) according to the embodiment.

FIGS. 4 to 6 are diagrams illustrating configurations according to a comparative example, each being a view of a cross section corresponding to that illustrated in FIG. 3. FIG. 4 illustrates the state of oil when the vehicle is in a horizontal position. FIG. 5 illustrates the state of oil when the vehicle is inclined to one side with respect to a horizontal plane as viewed in the Y direction (hereinafter also referred to as the "first inclined position"). FIG. 6 illustrates the state of oil when the vehicle is inclined to the other side as viewed in the Y direction (hereinafter also referred to as the "second inclined position"). FIGS. 7 and 8 are diagrams illustrating the state of oil in this embodiment, each being a view of a cross section corresponding to that illustrated in FIG. 3. FIG. 7 illustrates the state of oil when the vehicle is in the first inclined position. FIG. 8 illustrates the state of oil when the vehicle is in the second inclined position. In FIGS. 4 to 8, the shaded area 88 outlines the area where oil accumulates.

In the comparative example illustrated in FIGS. 4 to 6, a partition wall 2500' is provided with a communication hole 20' in its lower part. In this comparative example, the oil in the motor housing chamber SP1 and the gear housing chamber SP2 is also allowed to flow back and forth between the chambers through the communication hole 20'. Accordingly, as in the embodiment, a desired amount of oil can be secured in each of the motor housing chamber SP1 and the gear housing chamber SP2 when the vehicle is in a horizontal position.

However, in the case of the comparative example, since the communication hole 20' is formed in the partition wall 2500', it is difficult to secure an appropriate amount of oil in the motor housing chamber SP1 and the gear housing chamber SP2 when the position or behavior of the vehicle changes in various ways.

Specifically, in the first inclined position depicted in FIG. 5, the amount of oil in the gear housing chamber SP2, which is located vertically below the motor housing chamber SP1, is significantly larger than that in the motor housing chamber SP1, as schematically illustrated in FIG. 5. In a state where the oil is allocated in this way, there is a possibility that the ability of the oil to cool the rotating electrical machine 1 may be reduced due to a lack of oil on the motor housing chamber SP1 side. There is also a possibility that the oil pump (not illustrated) may suck in the air (i.e., a possibility of air suction) as a result of the strainer 90 being exposed to the air. In addition, if there is an excessive amount of oil on the gear housing chamber SP2 side, a relatively large area of the differential input gear 51 may be immersed in the oil, which may increase the load (resistance) to the rotation of the differential input gear 51.

Likewise, in the second inclined position depicted in FIG. 6, the amount of oil in the motor housing chamber SP1, which is located vertically below the gear housing chamber SP2, is significantly larger than that in the gear housing chamber SP2, as schematically illustrated in FIG. 6. In a state where the oil is allocated in this way, due to a lack of oil on the gear housing chamber SP2 side, there is a possibility that the differential input gear 51 may be unable or insufficient to scrape up the oil and that the ability of the oil to lubricate the power transmission mechanism 7 may be reduced. In other words, there is a risk that the oil scraped up by the rotation of the differential input gear 51 may be insufficient, resulting in insufficient lubrication of the bearings BR3, BR4, and the like. In addition, if there is an excessive amount of oil on the motor housing chamber SP1 side, a rotor 10 of the rotating electrical machine 1 may be immersed in the oil, which may increase the load (resistance) to the rotation of the rotor 10.

Although not illustrated, a similar problem may occur when the communication hole 20' is located above the lowest part of the partition wall 2500' in the comparative example. In such a case, if the position of the communication hole 20' is relatively high, the oil that has moved when the vehicle is in an inclined position does not return completely after the vehicle is brought back to a horizontal position. As a result, the amount of oil allocated between the motor housing chamber SP1 and the gear housing chamber SP2 tends to become unstable. In other words, it is likely to cause a further problem that the oil levels do not match between the motor housing chamber SP1 and the gear housing chamber SP2 (i.e., a desired amount of oil cannot be secured in the motor housing chamber SP1 and the gear housing chamber SP2) when the vehicle is in a horizontal position.

On the other hand, according to the embodiment, the disadvantages that arise in the comparative example can be reduced or eliminated.

Specifically, in the first inclined position depicted in FIG. 7, the oil accumulated in the motor housing chamber SP1 tends to move under its own weight toward the gear housing chamber SP2, which is located vertically below the motor housing chamber SP1, as in the comparative example; however, the movement stops when the oil level reaches the height of the opening 21. As described above, the opening 21 is located away from the partition wall 2500 toward the X2 side. Therefore, as schematically illustrated in FIG. 7, even when the oil level reaches the height of the opening 21, a relatively large amount of oil can be secured in the motor housing chamber SP1. In this case, the oil pump can still draw the oil through the strainer 90. Thus, according to the embodiment, it is possible to eliminate or reduce the above-mentioned disadvantages that arise in the comparative example (the possibility that the ability to cool the rotating electrical machine 1 may be reduced due to a lack of oil on the motor housing chamber SP1 side, air suction, etc.).

Likewise, in the second inclined position depicted in FIG. 8, the oil accumulated in the gear housing chamber SP2 tends to move under its own weight toward the motor housing chamber SP1, which is located vertically below the gear housing chamber SP2, as in the comparative example; however, the movement stops when the oil level reaches the height of the opening 22. As described above, the opening 22 is located away from the partition wall 2500 toward the X1 side. Therefore, as schematically illustrated in FIG. 8, even when the oil level reaches the height of the opening 22, a relatively large amount of oil can be secured in the motor housing chamber SP1. In this case, the differential input gear 51 can still scrape up the oil. Thus, according to the embodiment, it is possible to eliminate or reduce the above-mentioned disadvantages that arise in the comparative example (the possibility that the ability to lubricate the power transmission mechanism 7 may be reduced due to a lack of oil on the gear housing chamber SP2 side, etc.).

Furthermore, according to the embodiment, the oil level in the motor housing chamber SP1 is prevented from rising excessively even when the vehicle is in the second inclined position. For this reason, it is also possible to place parts that are preferably located where they can avoid oil splashes, such as a breather (not illustrated), in the upper part or the like of the motor housing chamber SP1. Incidentally, the breather is a hole that adjusts the flow of air in and out of the case 2 in response to the expansion and contraction of the air due to temperature changes inside the sealed case 2 and also prevents water, oil, and the like from entering.

Thus, according to the embodiment, due to the presence of the communication oil passage 20 as described above, even when the position or behavior of the vehicle changes in various ways, an appropriate amount of oil can be secured in the motor housing chamber SP1 and the gear housing chamber SP2.

Incidentally, in the first inclined position described above with reference to FIG. 7, in order to secure sufficient oil above the strainer 90 when the oil level reaches the height of the opening 21, it is more advantageous to have the opening 21 at a position higher and closer to the X2 side. On the other hand, a higher position of the opening 21 is disadvantageous in that oil residue is more likely to occur when the oil is drained from the lowest part.

With respect to this point, according to the embodiment, since the distance (dimension) from the partition wall 2500 to the motor cover 252 is relatively large in the X direction, the opening 21 can be located sufficiently away from the partition wall 2500 toward the X2 side. For example, the opening 21 can be located near the mating surfaces of the motor case 250 and the motor cover 252. This allows sufficient oil to be secured above the strainer 90 when the vehicle is in the first inclined position without raising the position of the opening 21. In this case, the opening 21 may be formed at the lowest position of the motor housing chamber SP1.

Similarly, in the second inclined position described above with reference to FIG. 8, in order to secure sufficient oil around the lower end of the differential input gear 51 when the oil level reaches the height of the opening 22, it is more advantageous to have the opening 22 at a position higher and closer to the X1 side.

With respect to this point, according to the embodiment, since the distance (dimension) from the partition wall 2500 to the X1 side end of the gear case 254 (the X1 side end of the gear housing chamber SP2) is relatively small in the X direction, it is difficult to have the opening 22 at a position sufficiently away from the partition wall 2500 toward the X1 side. In the embodiment, however, the opening 22 is formed at a relatively high position, which allows sufficient oil to be secured around the lower end of the differential input gear 51 when the vehicle is in the second inclined position.

Specifically, according to the embodiment, the communication oil passage 20 includes an axial oil passage 200 that extends in the axial direction and an upward oil passage 202 that extends upward at the X1 side end of the axial oil passage 200. That is, in the communication oil passage 20, the axial oil passage 200 and the upward oil passage 202 form an L-shape in a cross-sectional view such as that illustrated in FIG. 3. The axial oil passage 200 includes the above-mentioned oil passage 2509 and a portion of the oil passage 2549. The upward oil passage 202 is formed of another portion of the oil passage 2549. In other words, the X1 side end of the oil passage 2549 forms the upward oil passage 202 that extends upward. The upward oil passage 202 has the opening 22 as an upward opening at its upper end. Due to the presence of the upward oil passage 202, the opening 22 can be formed at a relatively high position. As a result, sufficient oil can be secured around the lower end of the differential input gear 51 when the vehicle is in the second inclined position. Thus, it is possible to ensure sufficient oil around the lower end of the differential input gear 51 when the vehicle is in the second inclined position, as well as to minimize the size of the gear case 254 in the axial direction.

Figure 9:
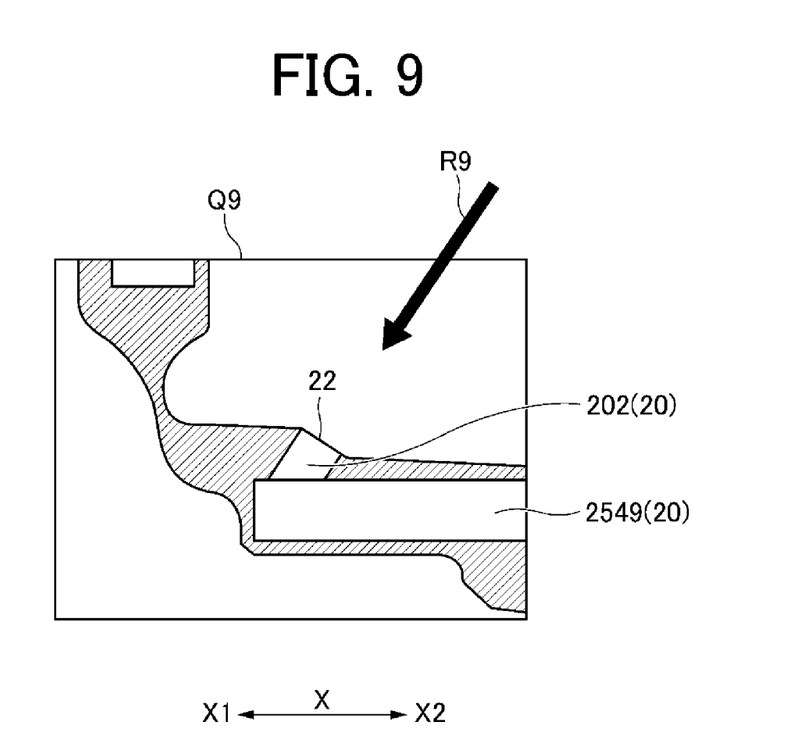
FIG. 9 is a diagram for explaining a method of forming an upward oil passage of a gear case.

Incidentally, in this embodiment, the gear case 254 is closed on the X1 side and open on the X2 side. In this case, the upward oil passage 202 is preferably inclined such that its upper side is on the X2 side with respect to its lower side as viewed in a direction perpendicular and horizontal to the axial direction (e.g., as viewed in the direction of FIG. 3). Such an inclination of the upward oil passage 202 facilitates forming the upward oil passage 202 by access from the X2 side of the gear case 254. For example, when the gear case 254 is provided with the oil passage 2549 as illustrated in FIG. 9, the upward oil passage 202 can be easily formed by machining, as schematically indicated by arrow R9. FIG. 9 is a cross-sectional view of a portion designated by Q9 in FIG. 3.

While preferred embodiments of the disclosure have been described and illustrated, the disclosure is not limited to the embodiments disclosed herein. Various changes, modifications, and alterations may be made within the scope of the disclosure as defined in the appended claims. Furthermore, all or some of the parts or elements described in the above embodiments may be variously combined.

For example, although the communication oil passage 20 is formed in the case 2 in the embodiment described above, part or all of the communication oil passage 20 may be formed of a member other than the case 2, such as a pipe.

In addition, in the embodiment described above, the opening 21 is located on the X2 side of the strainer 90, more specifically, on the X2 side of the X2 side end face of the strainer 90, as a preferred example. As described above with reference to FIG. 7, this allows the oil pump to draw sufficient oil through the strainer 90 even when the vehicle is in the first inclined position. In a modification, however, the opening 21 may be located on the X2 side of the X1 side end face of the strainer 90 and on the X1 side of the X2 side end face. In this modification, it is still possible for the oil pump to draw oil through the strainer 90 even in the first inclined position described above with reference to FIG. 7. In this case, the opening 21 may be located at a position offset in the Y direction with respect to the strainer 90.

Furthermore, in the embodiment described above, the opening 22 is located on the X1 side of the differential input gear 51, more specifically, on the X1 side of the X1 side end face of the differential input gear 51, as a preferred example. As described above with reference to FIG. 8, this allows the differential input gear 51 to scrape up sufficient oil even when the vehicle is in the second inclined position. In a modification, however, the opening 22 may be located on the X1 side of the X2 side end face of the differential input gear 51 and on the X2 side of the X1 side end face. In this modification, it is still possible for the differential input gear 51 to scrape up oil even in the second inclined position described above with reference to FIG. 8.

LIST OF REFERENCE SIGNS

1 Rotating electrical machine
11 Rotor shaft

2 Case
2500 Partition wall
5 Differential gear mechanism
51 Differential input gear (gear)
7 Power transmission mechanism (transmission mechanism)
17 Vehicular drive device
20 Communication oil passage
200 Axial oil passage
202 Upward oil passage
21 Opening (first opening)
22 Opening (second opening)
90 Strainer
SP1 Motor housing chamber (first housing chamber)
SP10 Oil reservoir space (first oil reservoir space)
SP2 Gear housing chamber (second housing chamber)
SP20 Oil reservoir space (second oil reservoir space)

The invention claimed is:

1. A vehicular drive device, comprising:
a rotating electrical machine that has a rotor shaft extending in an axial direction;
a transmission mechanism that transmits a driving force from the rotating electrical machine to wheels;
a case that includes a first housing chamber configured to house the rotating electrical machine and a second housing chamber configured to house the transmission mechanism, the first housing chamber and the second housing chamber being located on a first side and a second side of the case in the axial direction, respectively;
a strainer; and
a communication oil passage through which oil passes and which communicates with the first housing chamber and the second housing chamber, wherein
a lower part of the first housing chamber forms a first oil reservoir space in which oil accumulates,
a lower part of the second housing chamber forms a second oil reservoir space in which oil to be scraped up by rotation of a gear that constitutes the transmission mechanism accumulates,
the case includes a partition wall that at least partially partitions between the first housing chamber and the second housing chamber in the axial direction and extends above the first oil reservoir space and the second oil reservoir space, and
the communication oil passage runs under the partition wall and includes:
a first opening that opens to the first housing chamber at a first position away from the partition wall toward the first side of the case in the axial direction, and
a second opening that opens to the second housing chamber at a second position away from the partition wall toward the second side of the case in the axial direction,
the strainer is located toward the first side of the case in the axial direction with respect to the partition wall, viewed in a direction perpendicular to the axial direction, and
the first position is located toward the first side of the case in the axial direction with respect to the strainer.

2. The vehicular drive device according to claim 1, wherein
the transmission mechanism includes a differential gear mechanism having a differential input gear, and
the second position is located toward the second side of the case in the axial direction from a first side end face of the differential input gear that faces the first side of the case in the axial direction as viewed in a direction perpendicular to the axial direction.

3. The vehicular drive device according to claim 2, wherein the second position is located toward the second side of the case in the axial direction from a second side end face of the differential input gear that faces the second side of the case in the axial direction as viewed in a direction perpendicular to the axial direction.

4. The vehicular drive device according to claim 3, wherein the communication oil passage includes:
an axial oil passage that extends in the axial direction, and
an upward oil passage that is continuous from the axial oil passage and extends upward at an end of the axial oil passage towards the second side of the case in the axial direction.

5. The vehicular drive device according to claim 4, wherein the upward oil passage is inclined such that an upper side thereof is toward the first side of the case in the axial direction with respect to a lower side thereof as viewed in a direction perpendicular and horizontal to the axial direction.

6. The vehicular drive device according to claim 2, wherein the communication oil passage includes:
an axial oil passage that extends in the axial direction, and
an upward oil passage that is continuous from the axial oil passage and extends upward at an end of the axial oil passage towards the second side of the case in the axial direction.

7. The vehicular drive device according to claim 6, wherein the upward oil passage is inclined such that an upper side thereof is toward the first side of the case in the axial direction with respect to a lower side thereof as viewed in a direction perpendicular and horizontal to the axial direction.

8. The vehicular drive device according to claim 1, further comprising an oil pump that draws the oil accumulated in the first oil reservoir space through the strainer,
wherein the first position is located toward the first side of the case in the axial direction from an end face of the strainer that faces the second side of the case in the axial direction as viewed in a direction perpendicular to the axial direction.

9. The vehicular drive device according to claim 8, wherein the communication oil passage includes:
an axial oil passage that extends in the axial direction, and
an upward oil passage that is continuous from the axial oil passage and extends upward at an end of the axial oil passage towards the second side of the case in the axial direction.

10. The vehicular drive device according to claim 9, wherein the upward oil passage is inclined such that an upper side thereof is toward the first side of the case in the axial direction with respect to a lower side thereof as viewed in a direction perpendicular and horizontal to the axial direction.

11. The vehicular drive device according to claim 1, wherein the communication oil passage includes:
an axial oil passage that extends in the axial direction, and
an upward oil passage that is continuous from the axial oil passage and extends upward at an end of the axial oil passage towards the second side of the case in the axial direction.

12. The vehicular drive device according to claim 11, wherein the upward oil passage is inclined such that an upper side thereof is toward the first side of the case in the axial direction with respect to a lower side thereof as viewed in a direction perpendicular and horizontal to the axial direction.

13. The vehicular drive device according to claim 1, wherein
the communication oil passage is an axial oil passage that runs under the partition wall to extend in the axial direction,
the communication oil passage includes an upward oil passage that is continuous from the axial oil passage and extends upward at an end of the axial oil passage towards the second side of the case in the axial direction, the upward passage having the second opening at an upper end thereof, and
the second opening is formed at a position higher than a bottom portion of the second chamber, the bottom portion being located toward the first side of the case in the axial direction with respect to the second opening.

14. A vehicular drive device, comprising:
a rotating electrical machine that has a rotor shaft extending in an axial direction;
a transmission mechanism that transmits a driving force from the rotating electrical machine to wheels;
a case that includes a first housing chamber configured to house the rotating electrical machine and a second housing chamber configured to house the transmission mechanism, the first housing chamber and the second housing chamber being located on a first side and a second side of the case in the axial direction, respectively; and
a communication oil passage through which oil passes and which communicates with the first housing chamber and the second housing chamber, wherein
a lower part of the first housing chamber forms a first oil reservoir space in which oil accumulates,
a lower part of the second housing chamber forms a second oil reservoir space in which oil to be scraped up by rotation of a gear that constitutes the transmission mechanism accumulates,
the case includes a partition wall that at least partially partitions between the first housing chamber and the second housing chamber in the axial direction and extends above the first oil reservoir space and the second oil reservoir space,
the communication oil passage includes:
an axial oil passage that runs under the partition wall to extend in the axial direction, and has a first opening that opens to the first housing chamber at a first position away from the partition wall toward the first side of the case in the axial direction, and
an upward oil passage that is continuous from the axial oil passage and extends upward at an end of the axial oil passage towards the second side of the case in the axial direction, the upward oil passage having a second opening, at an upper end thereof, that opens to the second housing chamber at a second position away from the partition wall toward the second side of the case in the axial direction, and
the second opening is formed at a position higher than a bottom portion of the second chamber, the bottom portion being located toward the first side of the case in the axial direction with respect to the second opening.

* * * * *